United States Patent
Patterson et al.

(10) Patent No.: US 10,829,022 B2
(45) Date of Patent: Nov. 10, 2020

(54) VEHICLE BODY STRUCTURE

(71) Applicant: Nissan North America, Inc., Franklin, TN (US)

(72) Inventors: Ian Patterson, Novi, MI (US); Martin Petersen, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 141 days.

(21) Appl. No.: 16/223,722

(22) Filed: Dec. 18, 2018

(65) Prior Publication Data

US 2020/0189437 A1 Jun. 18, 2020

(51) Int. Cl.
  *B60J 9/00* (2006.01)
  *B60N 3/02* (2006.01)
  *B60R 3/02* (2006.01)

(52) U.S. Cl.
  CPC .............. *B60N 3/023* (2013.01); *B60N 3/026* (2013.01); *B60R 3/02* (2013.01)

(58) Field of Classification Search
  CPC .............. A63B 21/4035; A63B 21/075; A63B 21/4043; B62B 5/067; A61M 25/0136; B60N 2/305; B60N 2/3013; B60N 2/36; A63J 19/006; A45F 5/00
  See application file for complete search history.

(56) References Cited

U.S. PATENT DOCUMENTS

| 5,687,813 | A | * | 11/1997 | Bensch | B60R 3/007 182/127 |
| 6,116,378 | A | * | 9/2000 | Barrow | B60R 3/02 182/127 |
| 7,090,276 | B1 | * | 8/2006 | Bruford | B60R 3/02 296/1.02 |
| 7,175,377 | B2 | | 2/2007 | Womack et al. | |
| 7,530,619 | B1 | * | 5/2009 | Bruford | B60R 3/02 296/1.02 |
| 7,594,787 | B2 | | 9/2009 | Womack et al. | |
| 7,673,922 | B1 | * | 3/2010 | Grimes | B60R 3/02 280/166 |
| 8,052,019 | B2 | | 11/2011 | Plavetich | |
| 8,251,423 | B1 | | 8/2012 | Lingle | |
| 8,261,880 | B1 | * | 9/2012 | Hop | E06C 5/04 114/362 |
| 8,348,325 | B2 | * | 1/2013 | Hausler | B62D 33/0273 296/51 |
| 8,371,597 | B2 | * | 2/2013 | DeCrescenzo | B60R 3/00 280/163 |
| 8,393,657 | B1 | | 3/2013 | Duderstadt | |

(Continued)

*Primary Examiner* — Kiran B Patel
(74) *Attorney, Agent, or Firm* — Global IP Counselors, LLP

(57) ABSTRACT

A cargo area structure has a retractable step installed to the cargo area structure beneath a floor and a first side wall thereof. A handle assembly has a base and a grip handle supported to the base. The base is attached to an upright surface of the first side wall. The base also has a position locking mechanism configured such that in response to manual operation of the position locking mechanism, the grip handle is movable from a stowed orientation and an in-use orientation such that in the in-use orientation the grip handle is positioned such that an individual using the step to enter the cargo area grabs the grip handle for assistance in stepping up into the cargo area.

15 Claims, 14 Drawing Sheets

(56) References Cited

U.S. PATENT DOCUMENTS

| | | | |
|---|---|---|---|
| 8,408,853 B2 | 4/2013 | Womack et al. | |
| 8,550,757 B2 | 10/2013 | Anderson et al. | |
| 8,678,457 B1* | 3/2014 | Duderstadt | B60R 3/00 16/429 |
| 8,794,660 B1* | 8/2014 | Stover | A01D 34/64 280/727 |
| 9,022,445 B1* | 5/2015 | Duderstadt | B60N 3/023 296/1.02 |
| 9,623,787 B2 | 4/2017 | Sterling | |
| 9,623,915 B2* | 4/2017 | Worden | B62D 33/0273 |
| 10,183,623 B2* | 1/2019 | Krishnan | B60R 3/02 |
| 10,525,870 B2* | 1/2020 | Neighbors | B60P 3/40 |
| 10,533,374 B2* | 1/2020 | Jevaney | E06C 7/182 |
| 2003/0071434 A1* | 4/2003 | Budd | B60R 3/00 280/166 |
| 2003/0188925 A1* | 10/2003 | Korpi | B60R 3/02 182/127 |
| 2004/0217573 A1* | 11/2004 | Foster | B60R 3/005 280/166 |
| 2005/0121933 A1* | 6/2005 | Livingston | B60R 3/02 296/62 |
| 2007/0096422 A1* | 5/2007 | Dolan | B60R 3/02 280/163 |
| 2008/0136208 A1* | 6/2008 | Kuznarik | B62D 33/0273 296/62 |
| 2009/0273202 A1* | 11/2009 | Heaman | B62D 33/0273 296/26.1 |
| 2009/0322052 A1* | 12/2009 | Ruehl | B60R 3/00 280/166 |
| 2010/0025955 A1* | 2/2010 | Carr, Jr. | B60R 3/02 280/166 |
| 2010/0230209 A1* | 9/2010 | Hughes | E06C 1/397 182/106 |
| 2011/0168491 A1* | 7/2011 | Cheatham, Jr. | E06C 7/182 182/106 |
| 2012/0104721 A1* | 5/2012 | Genest | B60R 3/02 280/166 |
| 2014/0203587 A1* | 7/2014 | Krishnan | B60R 3/02 296/62 |
| 2015/0165963 A1* | 6/2015 | Salter | B60Q 1/2661 315/77 |
| 2015/0291086 A1* | 10/2015 | Salter | B60Q 1/2661 362/485 |
| 2017/0320419 A1 | 11/2017 | Gobart | |
| 2019/0256002 A1* | 8/2019 | Patterson | B60R 3/02 |
| 2019/0256004 A1* | 8/2019 | Patterson | B62D 33/0273 |
| 2019/0256006 A1* | 8/2019 | Patterson | B60R 3/005 |

* cited by examiner

VEHICLE BODY STRUCTURE

BACKGROUND

Field of the Invention

The present invention generally relates to a vehicle body structure that includes a retractable step and a handle assembly. More specifically, the present invention relates to a vehicle body structure that includes a retractable step and a handle assembly where the handle assembly is fixedly attached to an upper area of a side wall of a pickup truck cargo area such that an individual using the step holds the handle assembly to aid in climbing up to the cargo area.

Background Information

Pickup truck cargo areas are usually at least two feet or more above ground level. Various step structures and handle devices have been proposed for assisting an individual when climbing up into the cargo area. However, most current handle devices are difficult to install and use, and, many take up valuable space within the cargo area.

SUMMARY

One object of the current disclosure is to provide a cargo area of a vehicle with a handle assembly that installs to a side wall of the cargo area and occupies a minimal amount of space within the cargo area at a location spaced apart and above a floor of the cargo area.

In view of the state of the known technology, one aspect of the present disclosure is to provide a vehicle body structure with a cargo area structure, a retractable step and a handle assembly. The cargo area structure has a floor, a first side wall and a tailgate at least partially defining a cargo area. The tailgate is movable between an open orientation exposing a rear end of the cargo area and a closed orientation blocking the rear end of the cargo area. The retractable step is installed to the cargo area structure beneath the floor and the first side wall and adjacent to the tailgate. The handle assembly has a base and a grip handle supported to the base. The base is attached to an upright surface of the first side wall. The base has a position locking mechanism configured such that in response to manual operation of the position locking mechanism the grip handle is movable from a stowed orientation and an in-use orientation. In the in-use orientation the grip handle is positioned such that an individual using the step to enter the cargo area grabs the grip handle for assistance in stepping up into the cargo area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
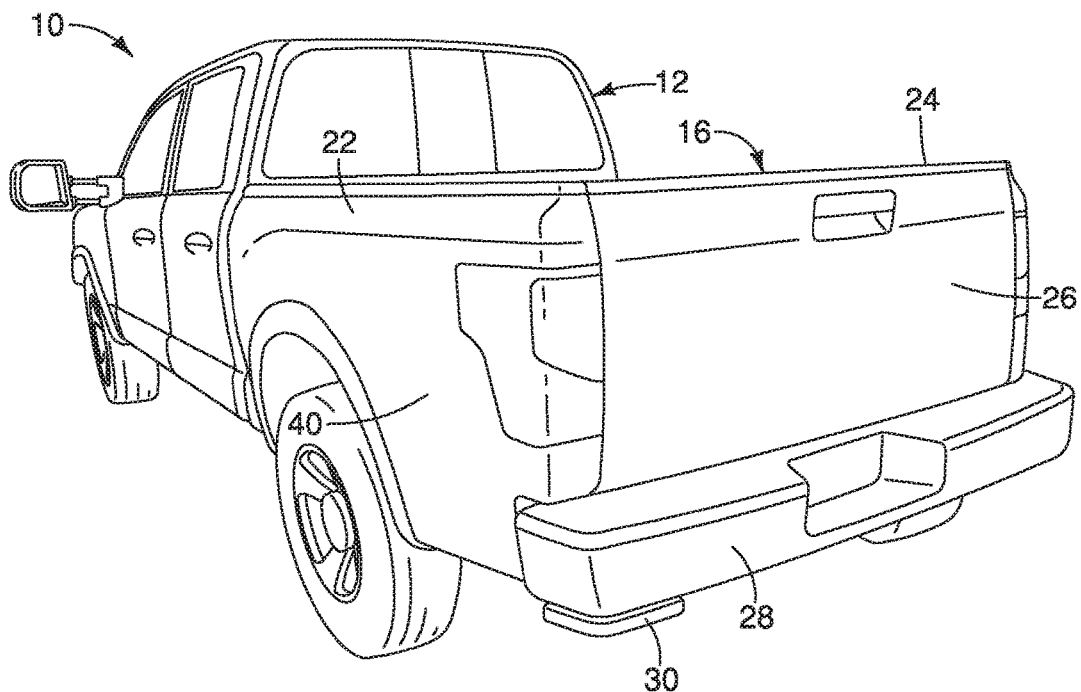
FIG. 1 is a rear perspective view of a vehicle that includes a cargo area structure, a bumper, a tailgate, a retractable step and a handle assembly, showing the tailgate in a closed orientation covering a rear end of the cargo area structure and showing the step in a retracted orientation beneath a rear corner of the bumper in accordance with the various embodiments.
Figure 2:
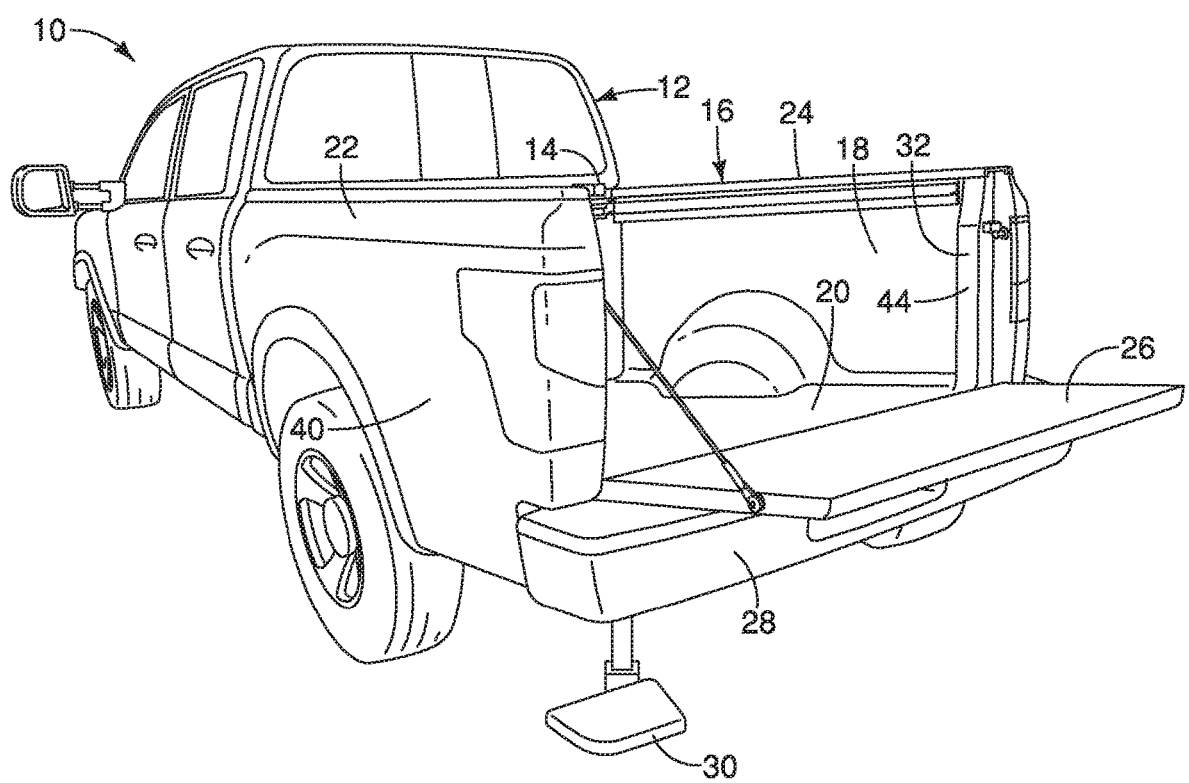
FIG. 2 is another rear perspective view of the vehicle similar to FIG. 1, showing the tailgate in an open orientation exposing a cargo area defined by the cargo area structure, and showing the step in an extended orientation extending rearward and laterally outboard relative to the bumper with the handle assembly being located above the rear corner of the bumper and the step, in accordance with the various embodiments.

Referring initially to FIGS. 1 and 2, a vehicle 10 has a vehicle body structure 12 that includes a handle assembly 14 (FIG. 2) used to step up into a cargo area structure 16 of the vehicle 10, is illustrated in accordance with a first embodiment. A cargo area 18 is defined within the cargo area structure 16.

In FIGS. 1 and 2, the vehicle body structure 12 of the vehicle 10 defines a pick-up truck design. Alternatively, the vehicle body structure 12 of the vehicle 10 can define any of a variety of vehicle designs that includes a cargo area that an individual might step up into in order to access, load or remove cargo within the cargo area.

The cargo area structure 16 of the vehicle 10 includes a floor 20, a first side wall 22, a second side wall 24, a tailgate 26, a bumper 28 and a step 30 installed beneath the floor 20 and the bumper 28 of the vehicle 10. The cargo area 18 is defined between the first side wall 22 and a second side wall 24 above the floor 20.

The first side wall 22 and the second side wall 24 extend upward along opposing outboard sides of the floor 20, defining a rear opening 32 therebetween. The tailgate 26 is pivotally attached to each of the first side wall 22 and the second side wall 24 such that the tailgate 26 is movable between an open orientation (FIG. 2) exposing the rear opening 32 of the cargo area structure 16 and a closed orientation (FIG. 1) blocking the rear opening 32 of the cargo area structure 16. Since tailgates, such as the tailgate 26, are conventional pickup truck features, further description is omitted for the sake of brevity.

The bumper 28 is fixedly attached to the vehicle body structure 12 in a conventional manner, such as mechanical fasteners or welding techniques. The bumper 28 extends laterally from respective a rear end the first side wall 22 to the rear end of the second side wall 24. The bumper 28 is located beneath the rear opening 32 of the cargo area structure 16 such that the tailgate 26 can freely move relative to the bumper 28 between the open orientation (FIG. 2) and the closed orientation (FIG. 1).

The retractable step 30 installed to the cargo area structure 16 at a location beneath the floor 20 and beneath a rear end of the first side wall 22, adjacent to the tailgate 26. More specifically, the retractable step 30 can be fixedly attached to a chassis (not shown) of the vehicle body structure 12, to elements of the floor 20 of the cargo area structure 16, or to the bumper 28. The retractable step 30 is movable from a retracted orientation shown in FIG. 1 to an extended orientation shown in FIG. 2. In the retracted orientation, the step 30 is partially concealed below the floor 20, the bumper 28 and the first side wall 22. In the extended orientation, the step 30 extends rearward and outboard away from the bumper 28 and relative to the cargo area 18. The retractable step 30 can include a telescoping structure, a pivoting structure, an articulated arm structure or a track and sliding step support structure (not shown) that enables the step 30 to move to and from the extended orientation (FIG. 2) underneath a rear corner of the bumper 28 and the retracted orientation (FIG. 1) in which the step 30 extends rearward from and laterally outboard of the rear corner of the bumper 28. Retractable steps, such as the step 30, are conventional structures. Consequently, further description is omitted for the sake of brevity.

Further, it should be understood from the drawings and the description hereinbelow, that the retractable step 30 can include any of a variety of designs and structures, such as a retractable step attached to or attachable to the first side wall 22 and/or the tailgate 26.

The first side wall 22 and the second side wall 24 are symmetrically constructed (mirror images of one another) but are otherwise structurally identical. Only the first side wall 22 will be described below for the sake of brevity. However, it should be understood from the drawings and the description herein that the description of the first side wall 22 applies equally to the second side wall 24.

Figure 3:
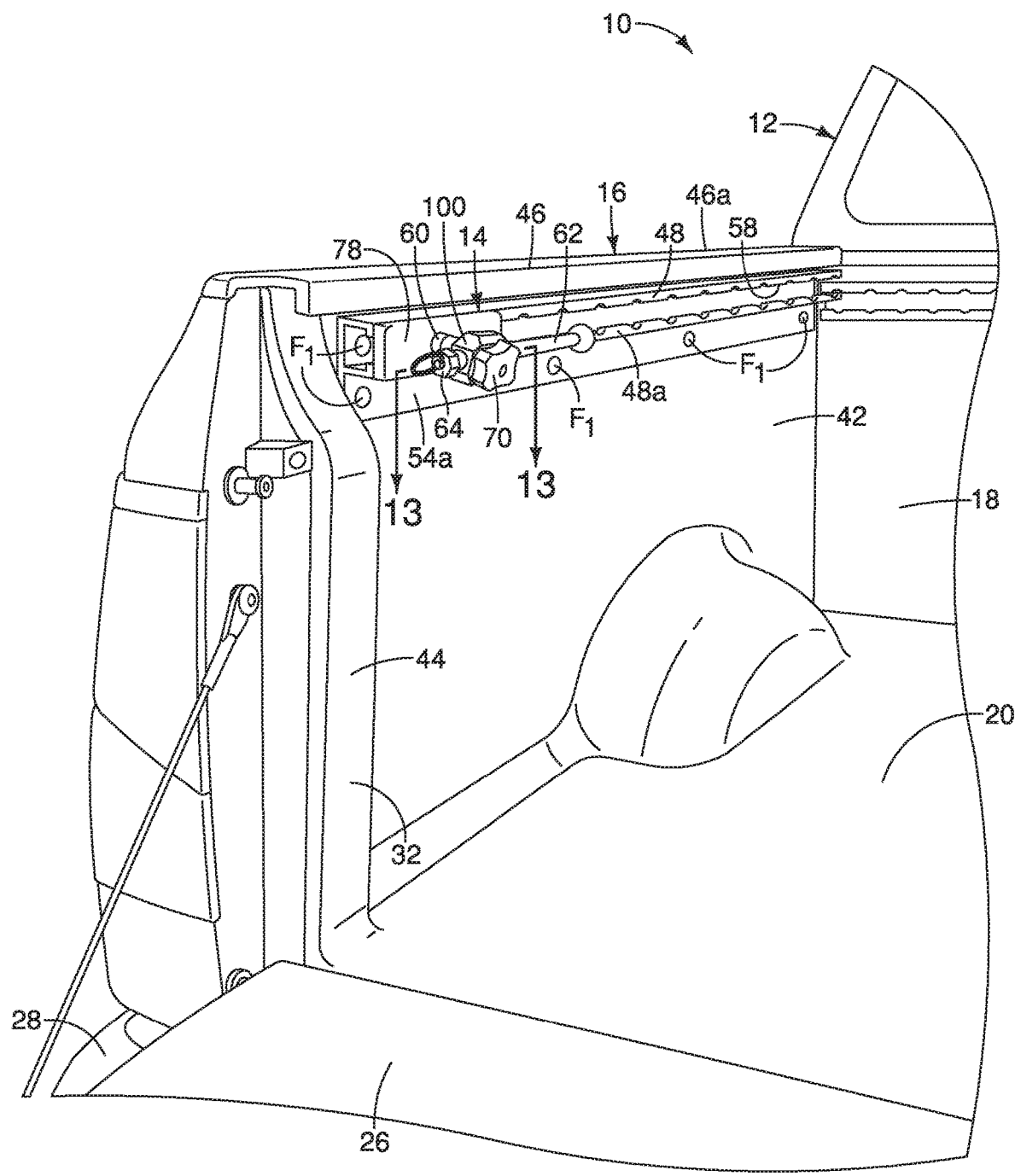
FIG. 3 is a rear perspective view of the cargo area structure showing a first side wall having a utility track installed along an upper area of the first side wall and a handle assembly removably installed to a rear end of the utility track at a location above the step, with the handle assembly in a stowed orientation in accordance with a first embodiment.

The first side wall 22 includes an outer panel 40 shown in FIGS. 1 and 2, an inner panel 42, a support pillar 44 and an upper panel portion 46 that are shown in FIG. 3. The outer panel 40 is contoured in accordance with an overall exterior design of the cargo area structure 16 and can have any of a variety of contours and/or shapes, or, can have a simple flat or near flat shape. The inner panel 42 can also be contoured and shaped in accordance the cargo area structure 16 design. However, in the depicted embodiment, the inner panel 42 is generally flat and planar extending perpendicularly upward from the floor 20, except in the area of the wheel well.

Figure 10:
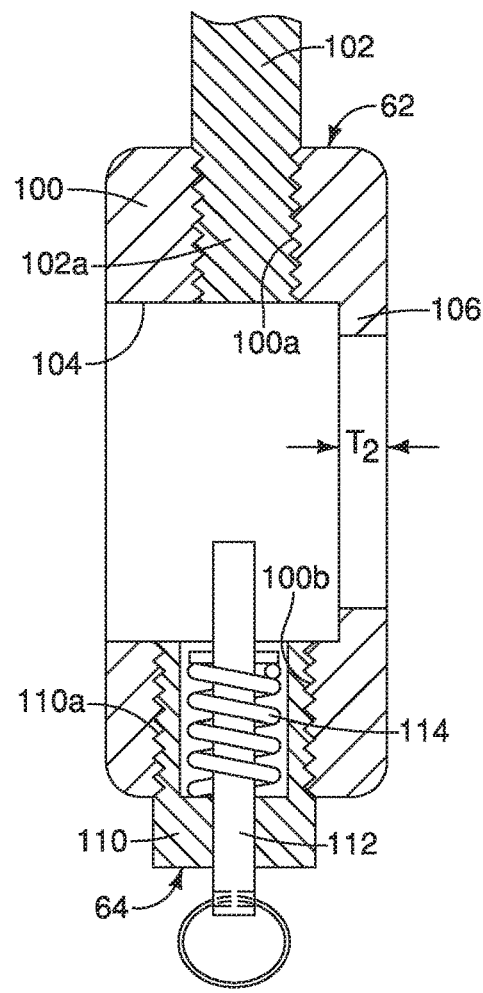
FIG. 10 is a cross-sectional view of a portion of the handle assembly taken along the line 10-10 in FIG. 6, showing the pivoting member and the locking portion removed from other portions of the handle assembly in accordance with the first embodiment.
Figure 11:
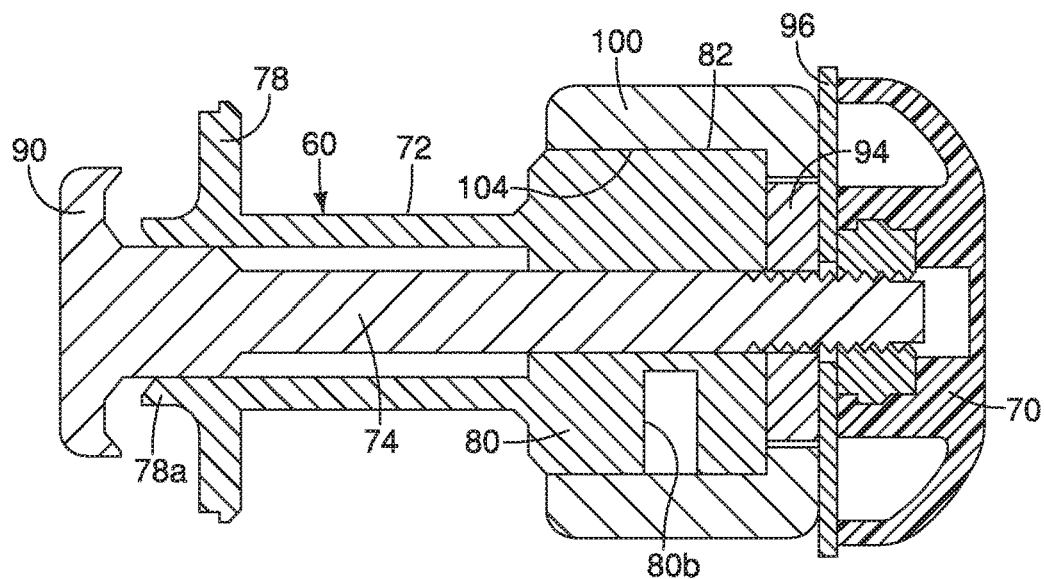
FIG. 11 is a cross-sectional view of the portion of the handle assembly depicted in FIG. 7, shown removed from the utility track in accordance with the first embodiment.
Figure 12:
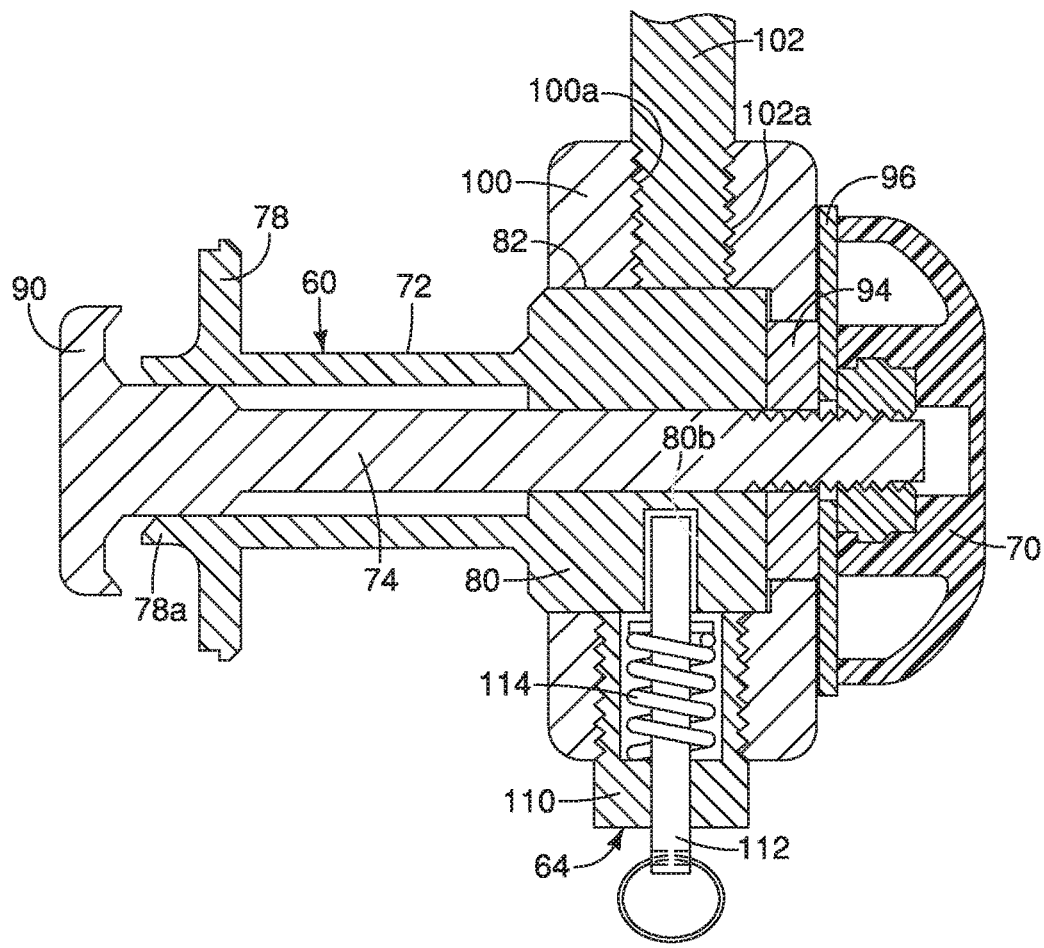
FIG. 12 is a cross-sectional view of the handle assembly taken along the line 10-10 in FIG. 6, showing the base, the grip handle and the locking portion removed from the utility track in accordance with the first embodiment.

The upper panel 46 is horizontally oriented and extends in a vehicle lateral inboard direction from an upper end of the outer panel 40. As shown in FIGS. 10, 11 and 12, the upper panel 46 overhangs an upper end of the inner panel 42. The upper panel 46 further defines an upper surface 46a of the first side wall 22.

Each of the first side wall 22 and the second side wall 24 includes a utility track 48. As shown in FIGS. 3-5 and 10-12, the utility track 48 is fixedly attached to the first side wall 22 immediately below the overhang of the upper panel 46. In other words, the upper panel 46 extends inboard over the utility track 48.

The utility track 48 is configured to receive and support cargo area accessories such as those disclosed in commonly assigned U.S. Pat. Nos. 9,623,787, 8,550,757, 8,408,853, 8,052,019 and 7,594,787, which are all incorporated herein by reference in their entirety. The utility track 48 is rigidly and fixedly attached to the first side wall 22 at a location below and adjacent to the upper surface 46a of the upper panel portion 46 of the first side wall 22.

Figure 4:
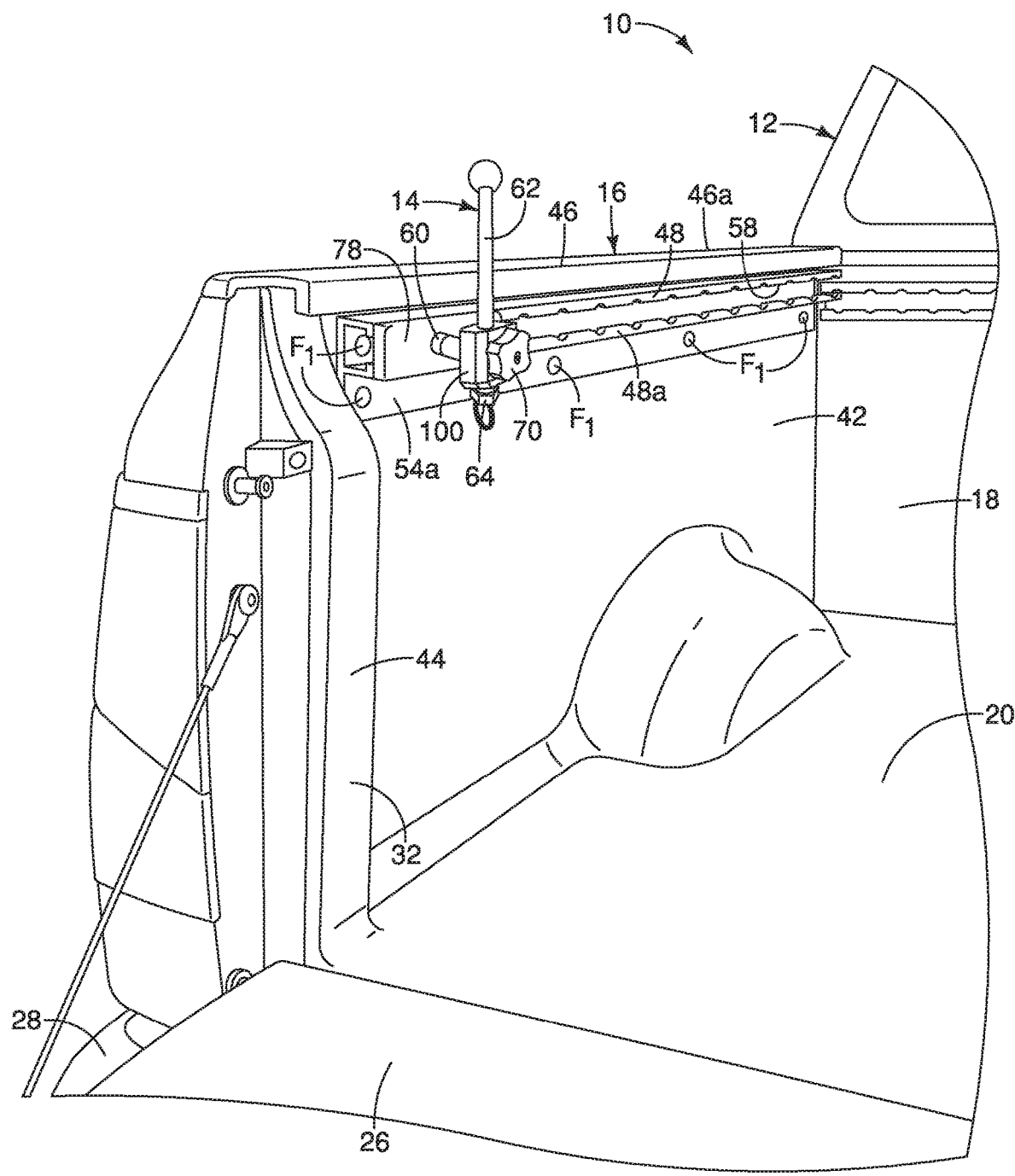
FIG. 4 is another rear perspective view of the cargo area structure similar to FIG. 3 showing the first side wall, the utility track and the handle assembly, with the handle assembly in an in-use orientation in accordance with a first embodiment.
Figure 5:
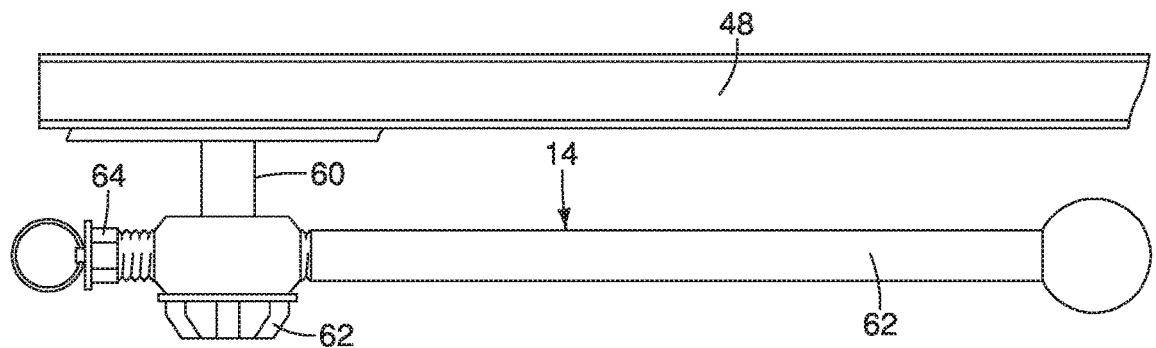
FIG. 5 is a top view of the handle assembly installed to the utility track showing the handle assembly in the stowed orientation in accordance with the first embodiment.
Figure 6:
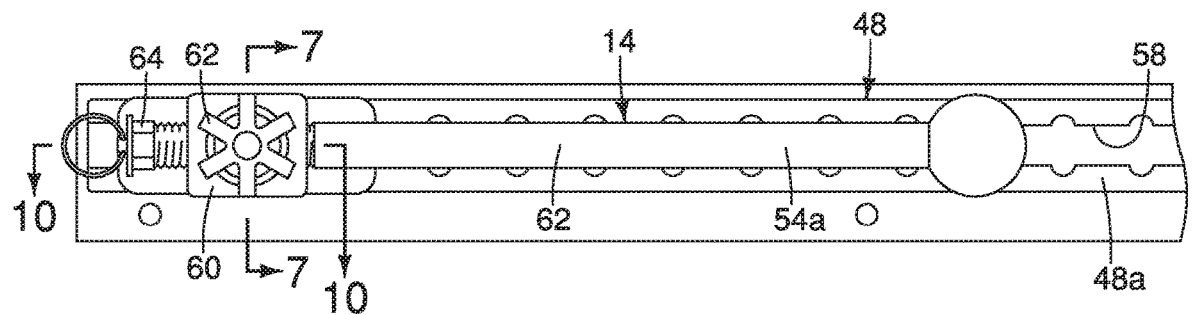
FIG. 6 is a side view of the handle assembly installed to the utility track showing the handle assembly in the stowed orientation in accordance with the first embodiment.

The utility track 48 is fastened to the inner panel 42 of the first side wall 22 via a plurality of pairs of fasteners $F_1$, as shown in FIGS. 3 and 4. The pairs of fasteners $F_1$ are vertically aligned and spaced apart from one another.

Figure 8:
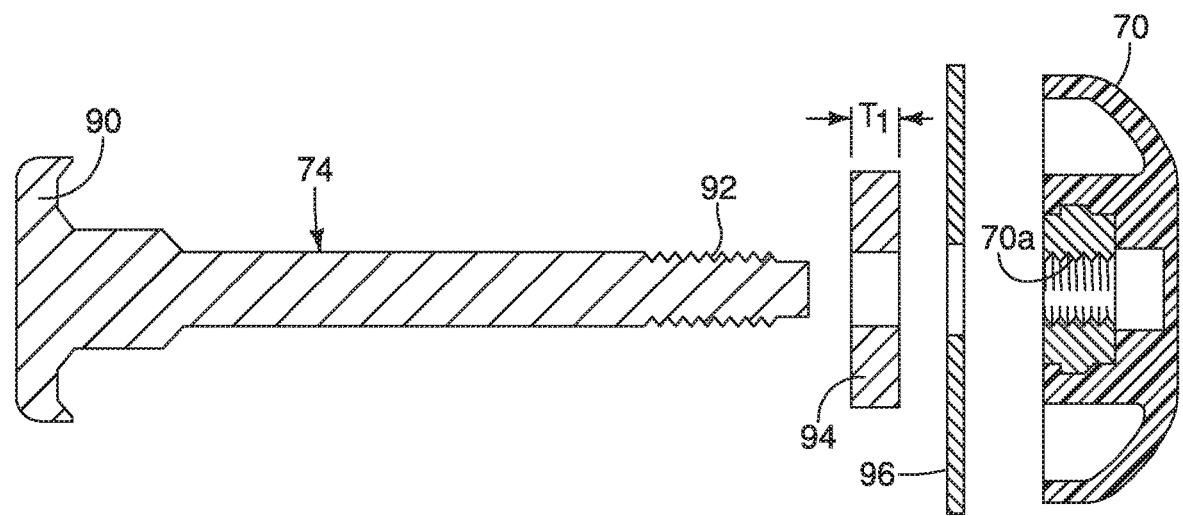
FIG. 8 another cross-sectional view showing a clamping member, a spacer, an annular washer and a threaded member or knob of the base of the handle assembly in accordance with the first embodiment.

The utility track 48 is an elongated member shown in cross-section in FIG. 8. The utility track 48 has a generally U-shaped configuration when viewed in cross-section. The U-shape of the utility track 48 defines an elongated hollow channel 50 (hereinafter referred to as the channel 50) surrounded on three sides by parallel walls 52 and base wall 54. Outer ends of the walls 52 are each formed with projections 56 that extend back into the channel 50. The ends of the projections 56 extend into the channel 50 but are spaced apart from the walls 52 and the base wall 54. An elongated opening 58 (a horizontally oriented gap) is defined between the projections 56 is open to the channel 50. Further, the rear end of the utility track 48 is open. The inboard vertical portions of the parallel walls 52 define an upright surface 48a. In other words, since the utility track 48 is fixed to the first side wall 22, the utility track 48 defines the upright surface 48a of the first side wall 22. The utility track 48 also includes a lower flange 54a. A lower one of each of the pairs of fasteners $F_1$ extends through the lower flange 54a. The base wall 54 and the lower flange 54a are co-planar in the depicted embodiments.

A description is now provided of the handle assembly 14 in accordance with a first embodiment with specific reference to FIGS. 3-15. The handle assembly 14 basically includes a base 60, a grip handle 62 and a locking portion 64. as described in greater detail below.

The base 60 is configured to secure the handle assembly 14 to the first side wall 22. In the first embodiment, the base 60 secures the handle assembly 14 to the utility track 48, which is directly attached to the first side wall 22 and structurally is part of the first side wall 22.

As shown in FIGS. 3 and 4, the grip handle 62 is movable between a stowed orientation (FIG. 3) and an in-use orientation (FIG. 4). The locking portion 64 is operated to freely release the grip handle 62 to that it can be moved (pivoted) between the stowed orientation and the in-use orientation, as described further below. When the locking portion 64 is not operated, it is spring biased to lock the grip handle 62 to either one of the stowed orientation and the in-use orientation, as is also described below.

Figure 7:
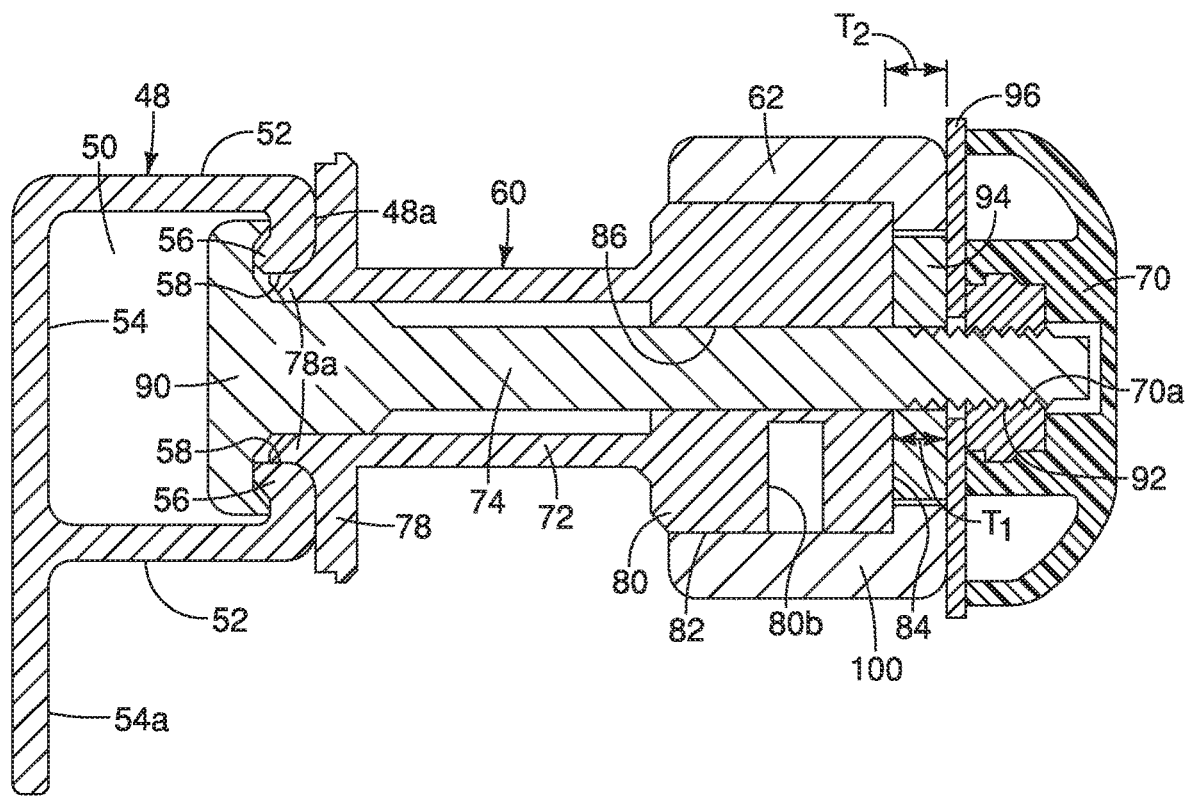
FIG. 7 is a cross-sectional view of a portion of the handle assembly and utility track taken along the line 7-7 in FIG. 6, showing a base, a grip handle and a locking portion in accordance with the first embodiment.
Figure 9:
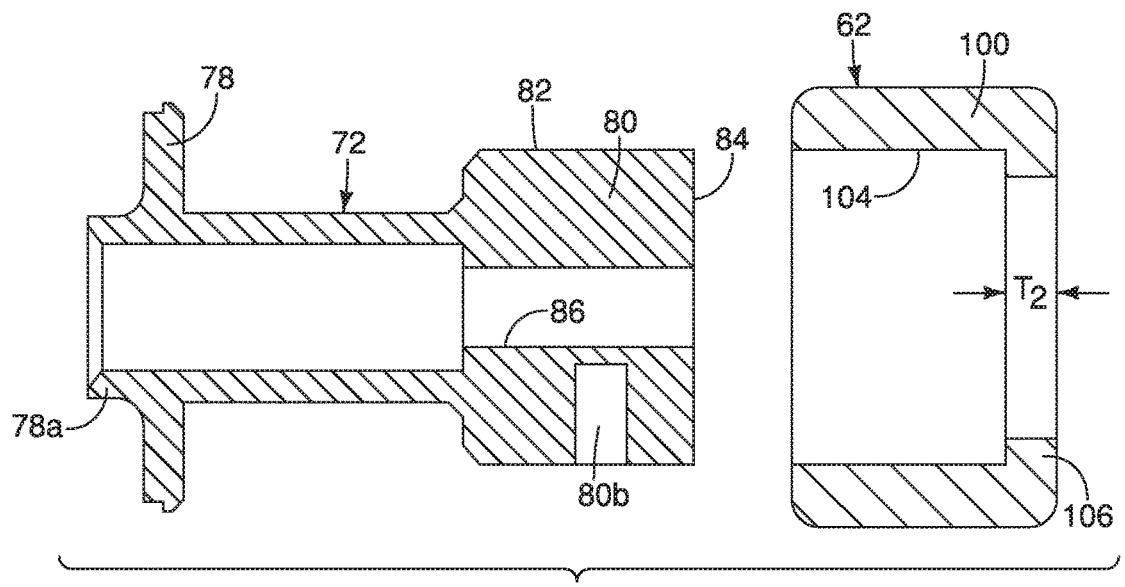
FIG. 9 is another cross-sectional view showing a base member of the base and a pivoting member of the grip handle of the handle assembly in accordance with the first embodiment.

As shown in FIGS. 7, 8 and 9, the base 60 includes an attachment assembly 68 and a threaded member 70 (a rotatable knob). The attachment assembly 68 is defined by a base member 72 (outer clamping member) and a clamping member 74 (inner clamping member) that are operated to produce a clamping effect by rotation of the threaded member 70. More specifically, the base member 72 and the clamping member 74 are configured to clamp around the projections 56 of the parallel walls 52 of the utility track 48.

The base member 72 is a cylindrically shaped member with a clamping flange 78 and a supporting end 80. The clamping flange 78 is a rectangularly shaped flat flange (as shown in FIGS. 3 and 4) that is configured to overlay the upright surface 48a of the utility track 48 when installed thereto. The clamping flange 78 includes an annular projection 78a that extend into the elongated opening 58 of the utility track 48. The projection 78a is dimensioned to contact the projections 56 within the elongated opening 58 thereby centering the base member 72 between the projections 56 of the parallel walls 52. The supporting end 80 (also referred to as a block member) is a cylindrically shaped portion that has an annular bearing surface 82. a flat end surface 84 and a central bore 86 extending completely through the base member 72. The annular bearing surface 82 is shaped and polished to rotatably support the grip handle 62, as described in greater detail below. The supporting end 80 also includes two openings 80a and 80b that are provided for use with the locking portion 64, as is described in greater detail below.

As shown in FIGS. 7 and 8, the clamping member 74 is an elongated member that has a clamping end 90 and a threaded end 92. The clamping member 74 is installed within the base member 72, extending through the central bore 86 thereof. As shown in FIG. 7, the clamping end 90 is dimensioned to fit and is inserted into the elongated hollow channel 50 of the utility track 48. The clamping end 90 contacts the projections 56 of the parallel walls 52 of the utility track 48. The threaded end 92 is configured to receive internal threads 70a.

The threaded member 70 is a knob or daisy wheel with outer surface contours that enable a vehicle operator or passenger to grip and rotate the threaded member 70 to loosen or tighten the attachment assembly 68. Specifically, the internal threads 70a of the threaded member 70 engage the threaded end 92 of the clamping member 74. When tightened, rotation of the threaded member 70 causes the clamping member 74 to engage and be drawn against the projections 56 of the utility track 48, while the base member 72 is pushed against the upright surface 48a, thereby clamping the projections 56 between the base member 72 and the clamping member 74.

The base 60 also includes a spacer 94 and an annular washer 96. The spacer 94 is basically a thick metal washer that has a first thickness $T_1$, as shown in FIGS. 7 and 8. The spacer 94 has an outer diameter smaller than the outer diameter of the supporting end 80 of the base member 72. The spacer 94 is positioned between the flat end surface 84 of the supporting end 80 of the base member 72 and the annular washer 96. The annular washer 96 has an outer diameter greater than the outer diameter of the supporting end 80 of the base member 72. The annular washer 96 is installed to the threaded end 92 of the clamping member 74 between the spacer 94 and the threaded member 70.

As shown in FIGS. 7-14, the grip handle 62 includes a pivoting member 100 and a rod-shaped member 102. The pivoting member 100 has an overall rectangular shape, as shown in FIGS. 3-4 and 13-14. The pivoting member 100 has an inner annular surface 104 and a radially inwardly extending annular flange 106 (hereinafter the annular flange 106) that extends radially inward from one end of the pivoting member 100. The inner annular surface 104 is a polished bearing surface that encircles and pivots about the annular bearing surface 82 of the supporting end 80. One or both of the inner annular surface 104 and the annular bearing surface 82 can be coated with a friction reducing material such as graphite, Polytetrafluoroethylene, hydrocarbon-based lubricants, or other suitable lubricating materials.

The annular flange 106 has a thickness $T_2$ that is smaller than the thickness $T_1$. With the handle assembly 14 fully assembled, the annular flange 106 extends radially inward and is confined between an outer radial portion of the flat end surface 84 of the supporting end 80 of the base member 72 and the annular washer 96. Consequently, the annular flange 106 and the entire pivoting member 100, with the rod-shaped member 102 of the grip handle 62 is free to pivot about the clamping member 74 and the base member 71 of the base 60. Pivoting movement of the grip handle 62 relative to the supporting end 80 is limited by the locking portion 64 (positioning locking mechanism), as is described further below.

The rod-shaped member 102 of the grip handle 62 is an elongated bar shaped member and can have a rectangular cross-section, or, can have a cylindrical shape, as shown in the first embodiment.

Figure 13:
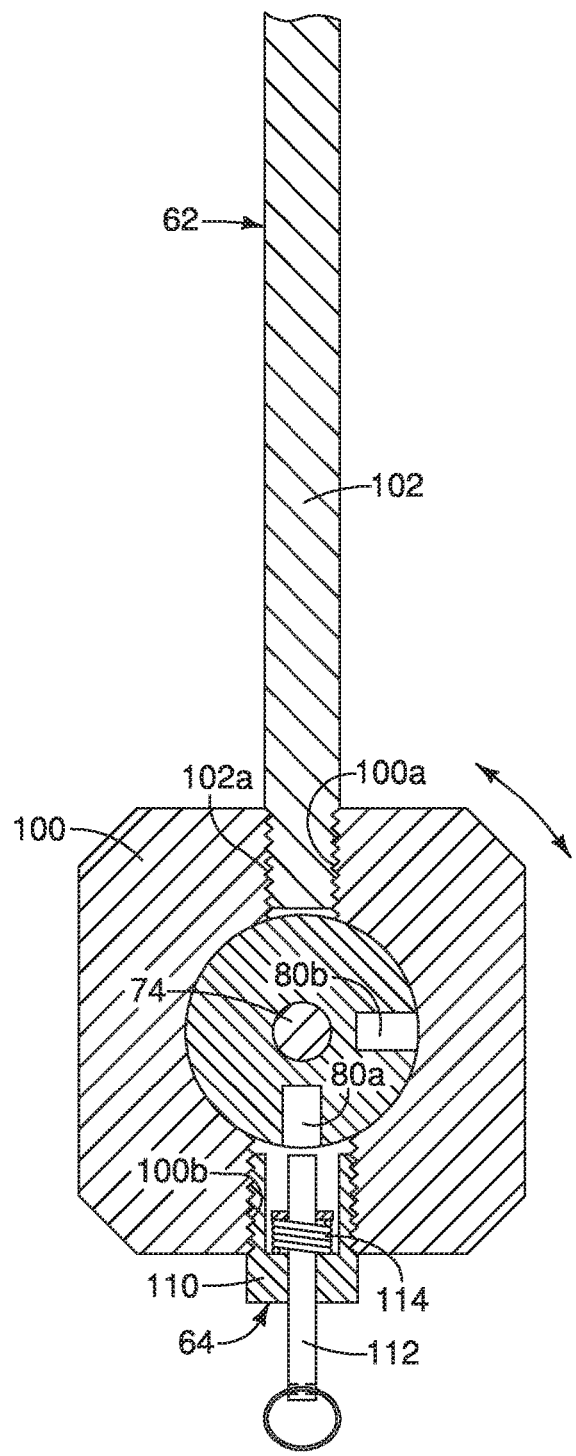
FIG. 13 is a cross-sectional view of the handle assembly taken along the line 13-13 in FIG. 3, showing portions of the base, the grip handle and the locking portion with the locking portion in an unlocked orientation in accordance with the first embodiment.
Figure 14:
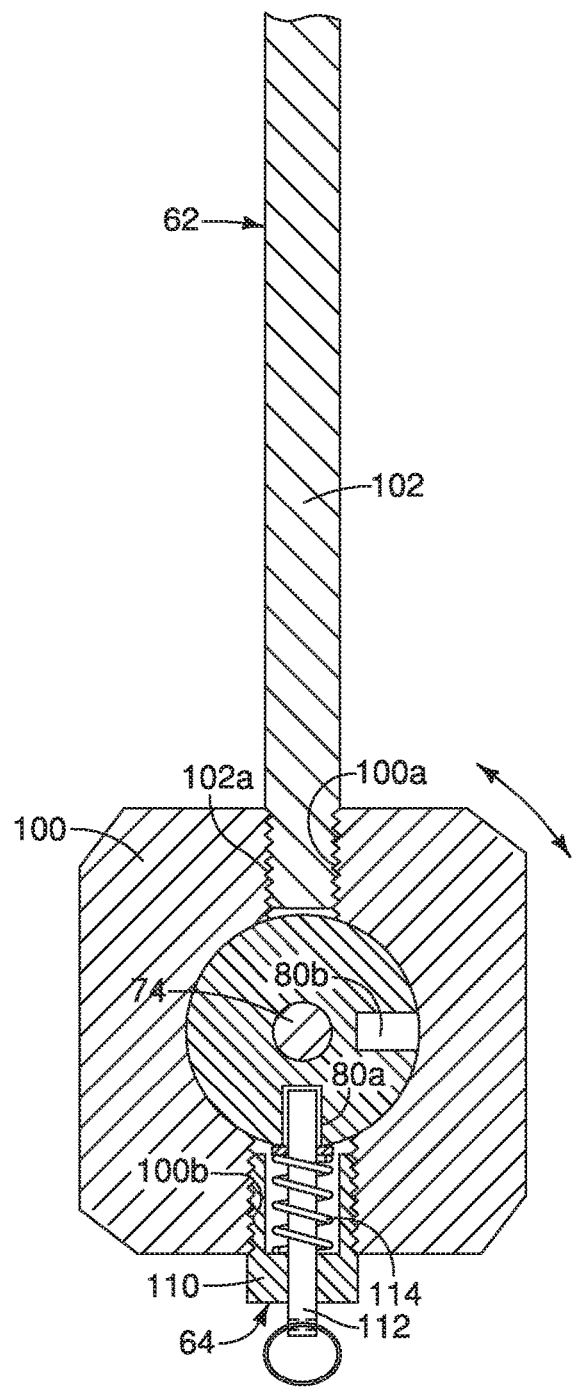
FIG. 14 is another cross-sectional view of the handle assembly similar to FIG. 13, showing the locking portion in a locked orientation in accordance with the first embodiment.
Figure 15:
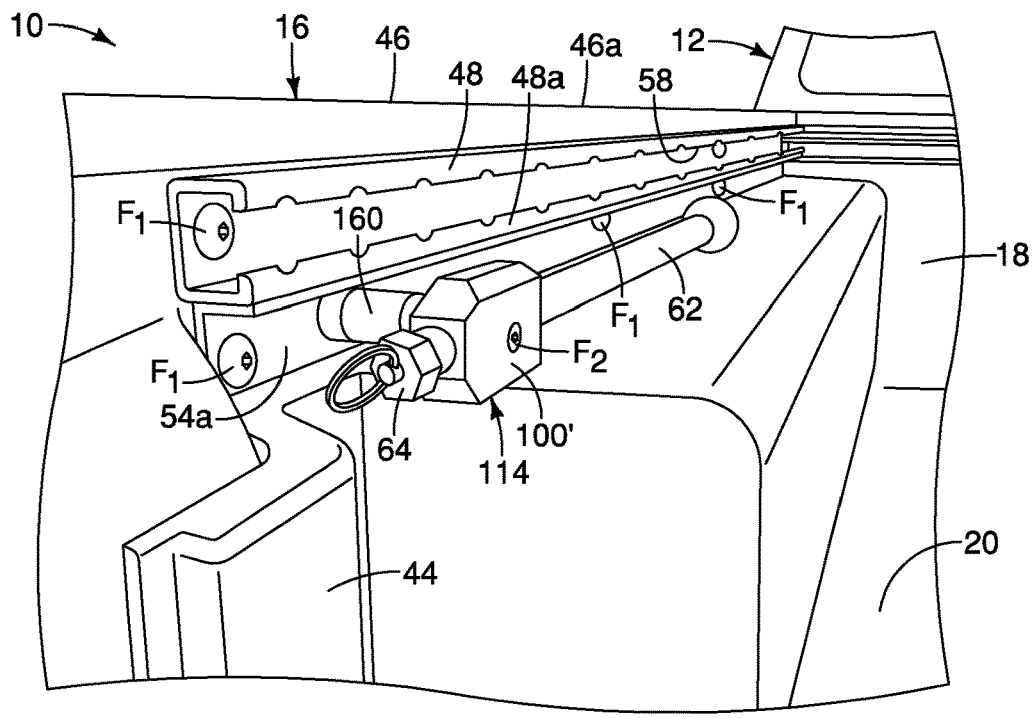
FIG. 15 is a rear perspective view of the cargo area structure showing a handle assembly removably installed to a lower flange of the utility track, with the handle assembly shown in a stowed orientation in accordance with a second embodiment.
Figure 16:
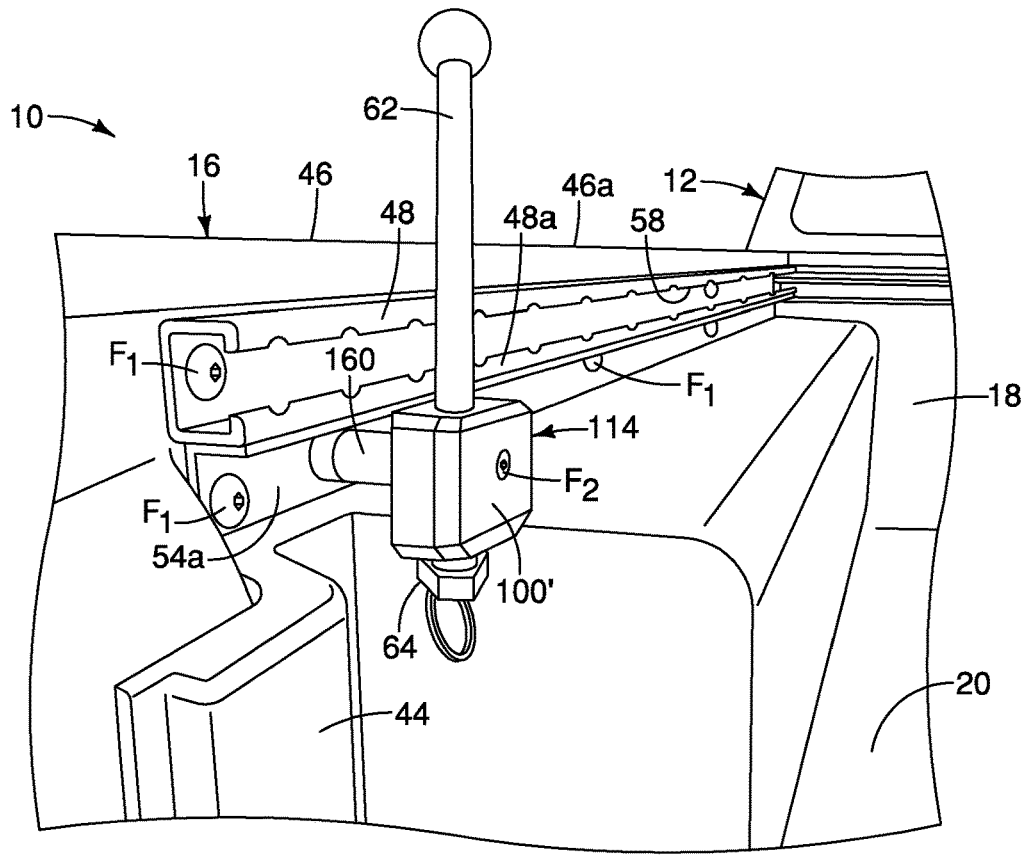
FIG. 16 is another rear perspective view of the cargo area structure showing the handle assembly removably installed to the lower flange of the utility track, with the handle assembly shown in an in-use orientation in accordance with the second embodiment.
Figure 17:
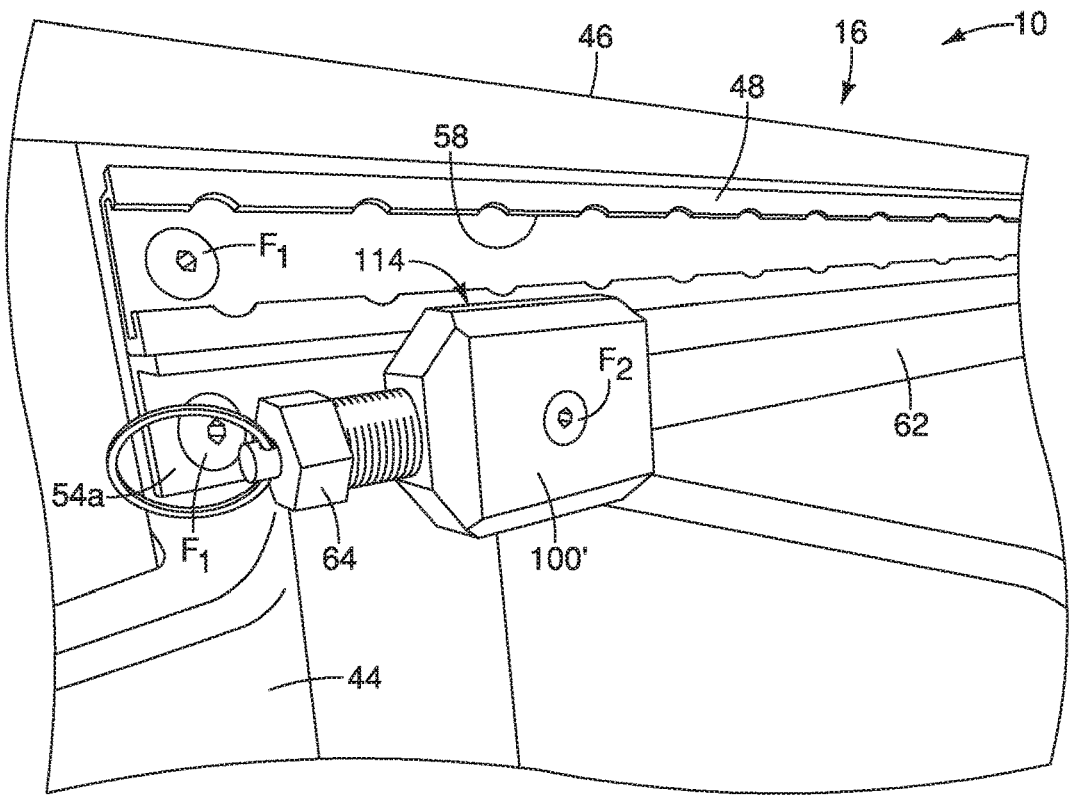
FIG. 17 is a side view of the cargo area structure showing the handle assembly in the stowed orientation in accordance with the second embodiment.

As shown in FIGS. 12-14, the rod-shaped member 102 has a threaded end 102a that screws into a first threaded opening 100a of the pivoting member 100. FIG. 11 depicts the handle assembly 14 in the stowed orientation, while FIG. 12 shows the handle assembly 14 in the in-use orientation.

As shown in FIGS. 10 and 12-14, the locking portion 64 includes a housing 110, a locking pin 112 and a biasing spring 114. The housing 110 includes a threaded surface 110a that threads into a second threaded opening 100b that is aligned with the first threaded opening 100a in the first embodiment. The housing 100 further includes a hollow interior that receives the biasing spring 114 and a portion of the locking pin 112. The biasing spring 114 is compressed by the locking pin 112 when the locking pin 112 is moved to an unlocking orientation, as shown in FIG. 13. The biasing spring 114 biases the locking pin 112 to move to a locking orientation as shown in FIG. 14. The biasing spring 114 biases the locking pin 112 to move into the opening 80a when the rod-shaped member 102 of the grip handle 62 is in the stowed orientation, as shown in FIGS. 3, 11 and 14. Further, the spring 114 biases the locking pin 112 to move into the opening 80b when the rod-shaped member 102 of the grip handle 62 is in the in-use orientation, as shown in FIGS. 4, 12 and 13.

In other words, the locking portion 64 (a position locking mechanism) is configured such that in the locking orientation (FIGS. 12 and 14), the pivoting member 100 and the grip handle 62 are prevented from pivoting relative to the supporting end 80 (the block member) of the base member 72. In the unlocked orientation (FIG. 13) the pivoting member 100 and the grip handle 62 are free to pivot about the supporting end 80 between the stowed orientation and the in-use orientation.

Figure 18:
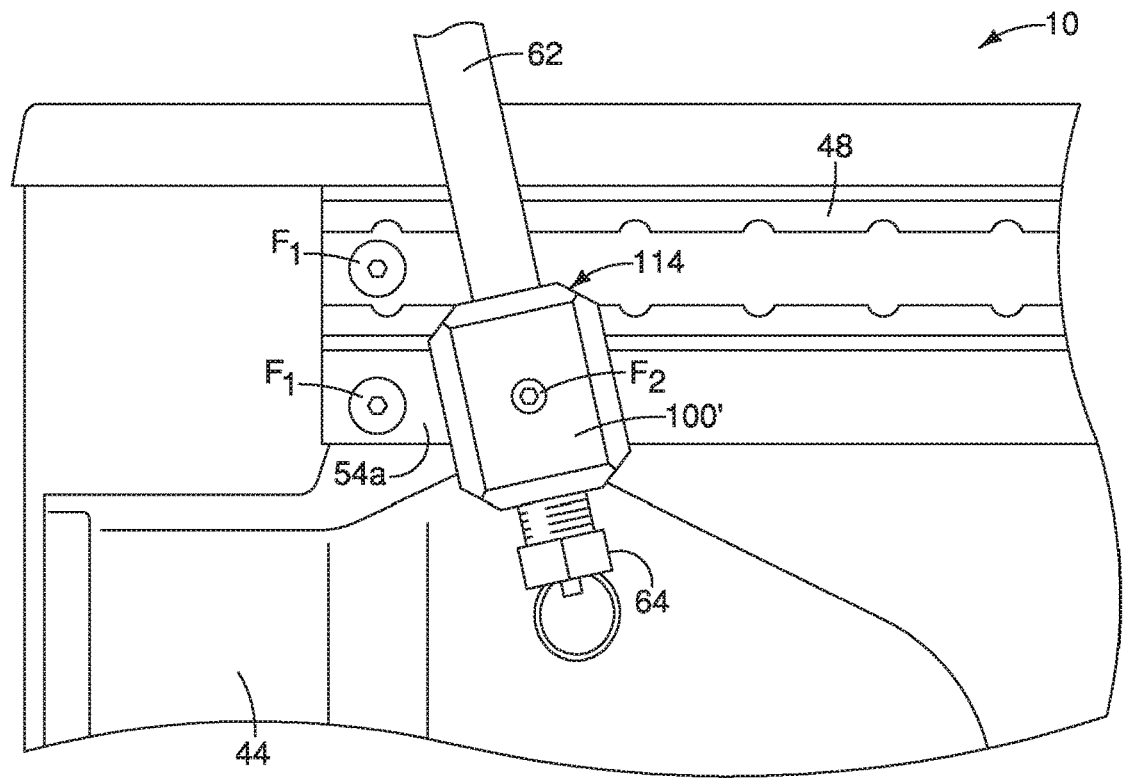
FIG. 18 is another side view of the cargo area structure showing the handle assembly in the in-use orientation in accordance with the second embodiment.
Figure 19:
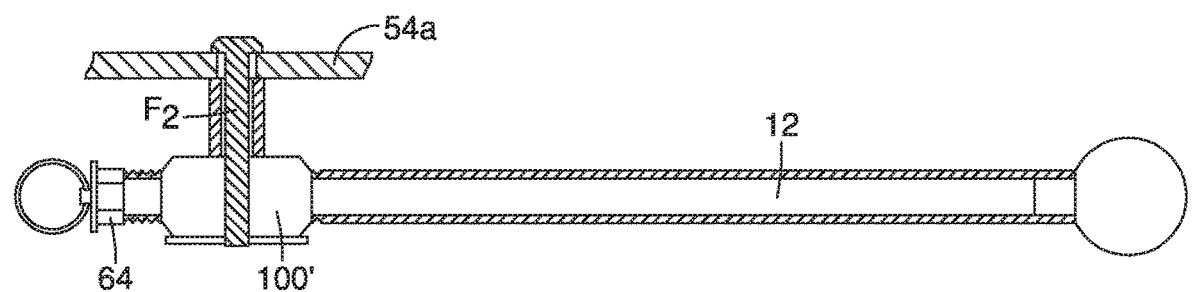
FIG. 19 is a top view of the handle assembly installed to the lower flange of the utility track with the handle assembly in the stowed orientation in accordance with the second embodiment.

As shown in FIGS. 4 and 12, when the grip handle 62 of the handle assembly 14 is in the in-use orientation, the grip handle 62 extends in an upright direction. Herein, the upright direction with respect to the in-use orientation can include a vertical orientation of the grip handle 62 or a slightly inclined orientation, as shown in FIG. 18 in the second embodiment.

The in-use orientation is determined by the position of the opening 80b in the support end 80 of the base member 72 of the base 60. Specifically, the locking pin 112 of the locking portion 64 (the position locking mechanism) extends into the opening 80a with the grip handle 62 in the stowed orientation, as shown in FIG. 14. The locking pin 112 of the locking portion 64 extends into the opening 80b with the grip handle 62 in the in-use orientation, as shown in FIG. 13. In FIGS. 13 and 14, the openings 80a and 80b extend in directions that are perpendicular to one another. Alternatively, the openings 80a and 80b can be oriented such that they extend in directions that define an angle greater than 90 such that the stowed orientation remains horizontal, but the in-use orientation is slightly inclined rearward relative to the vehicle, as shown in FIG. 18 of the second embodiment.

Second Embodiment

Referring now to FIG. 15-19, a handle assembly 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The handle assembly 114 includes a base 160, the grip handle 62 (as described above with respect to the first embodiment) and the locking portion 64 (as described above with respect to the first embodiment).

In the second embodiment, the base 60 of the first embodiment has been replaced with the base 160. The base 160 is configured to bolt on to the lower flange 54a of the utility track 48, Further, the threaded member 70 is integrated into a pivoting member 100' that is a modified copy of the pivoting member 100 of the first embodiment. Specifically, the pivoting member 100' includes all of the features of the pivoting member 100 of the first embodiment, but further includes a threaded aperture that receives and engages a fastener $F_2$ that secures the handle assembly 114 to the lower flange 54a of the utility track 48.

Further, the base 160 includes the support end 80 (not shown in FIGS. 15-19), as described above with respect to the first embodiment, and interacts with the locking portion 64 as described above with respect to the first embodiment.

Third Embodiment

Figure 20:
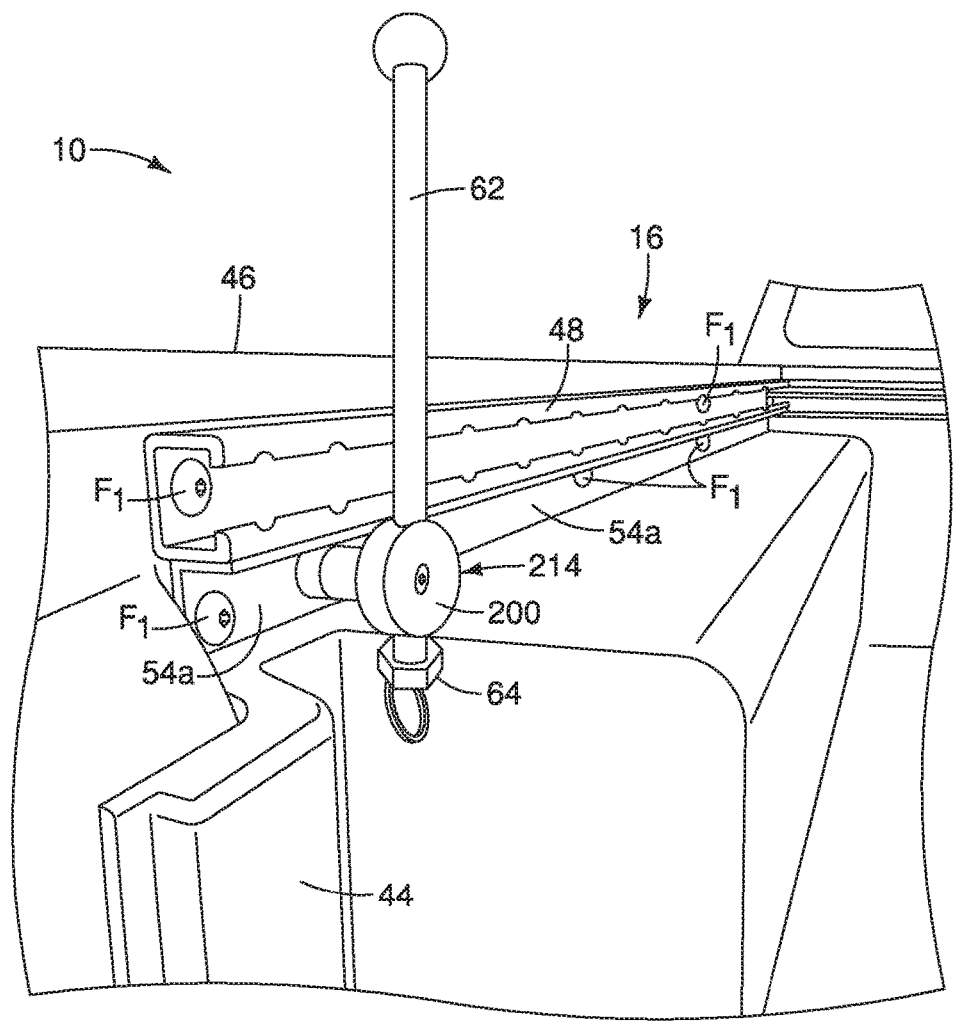
FIG. 20 is a rear perspective view of the cargo area structure showing a handle assembly removably installed to the lower flange of the utility track, with the handle assembly shown in an in-use orientation in accordance with a third embodiment.
Figure 21:
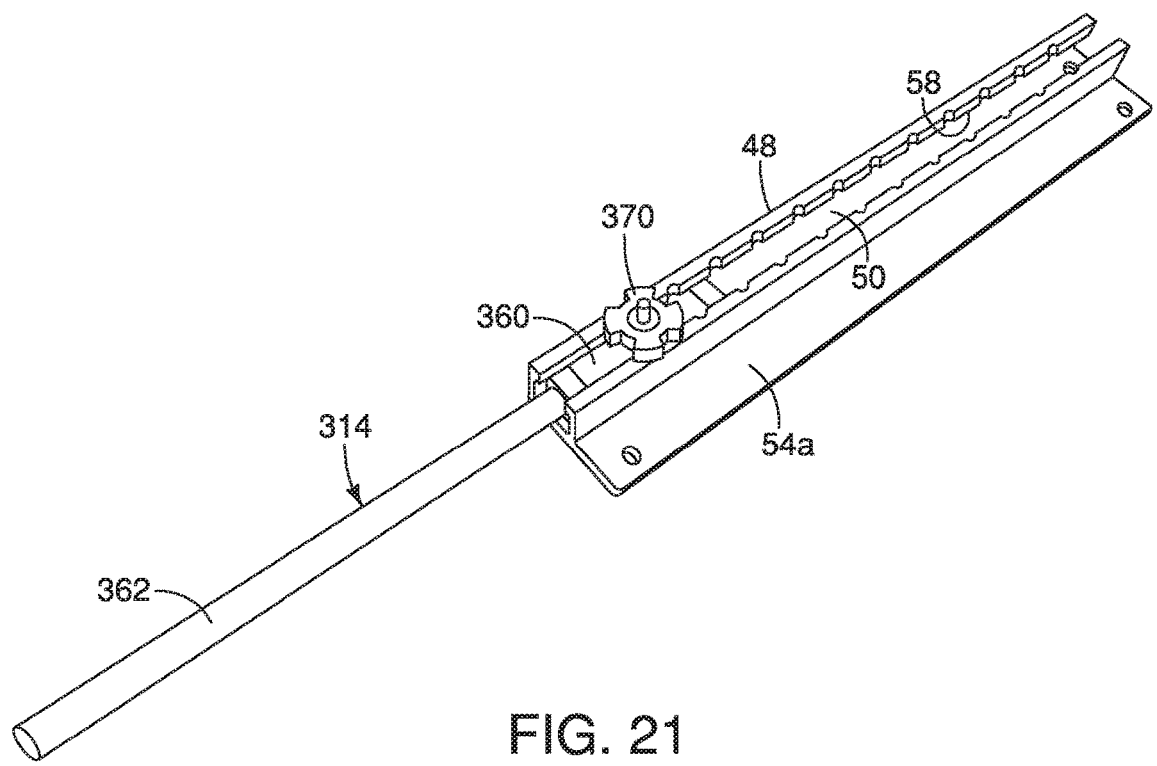
FIG. 21 is a perspective view of a handle assembly and a utility track removed from the cargo area structure showing the handle assembly in an in-use orientation in accordance with a fourth embodiment.
Figure 22:
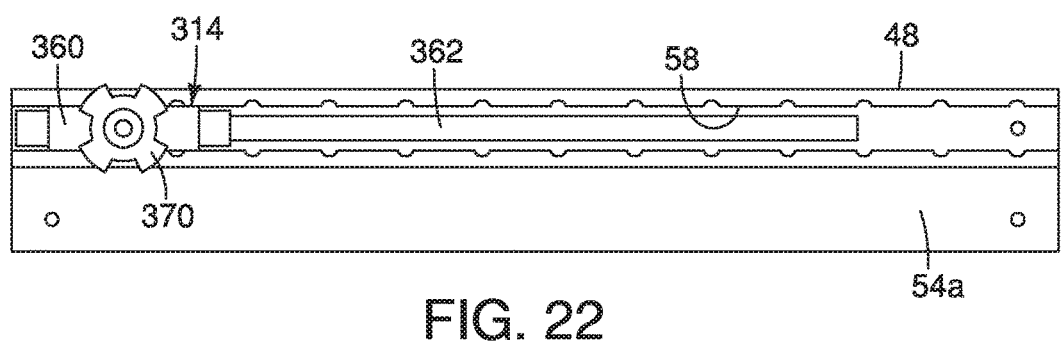
FIG. 22 is a perspective view of the handle assembly and the utility track showing the handle assembly in a stowed orientation in accordance with the fourth embodiment.
Figure 23:
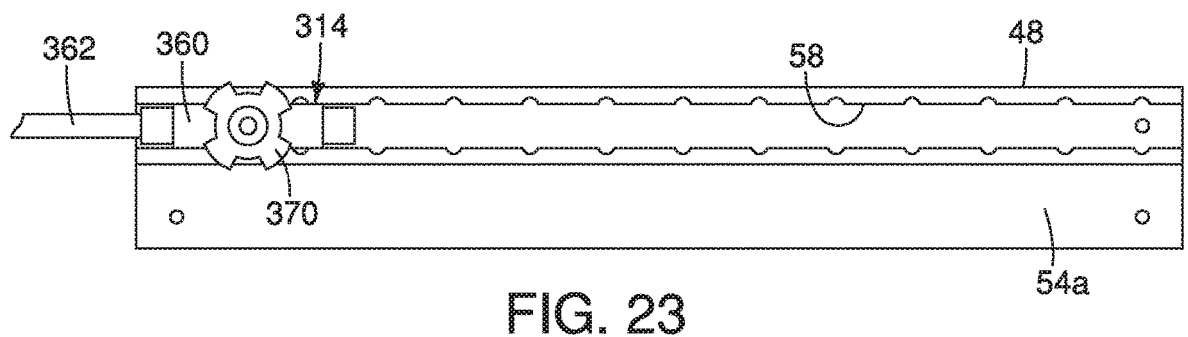
FIG. 23 is another side view of the handle assembly and the utility track showing the handle assembly in the in-use orientation in accordance with the fourth embodiment.
Figure 24:
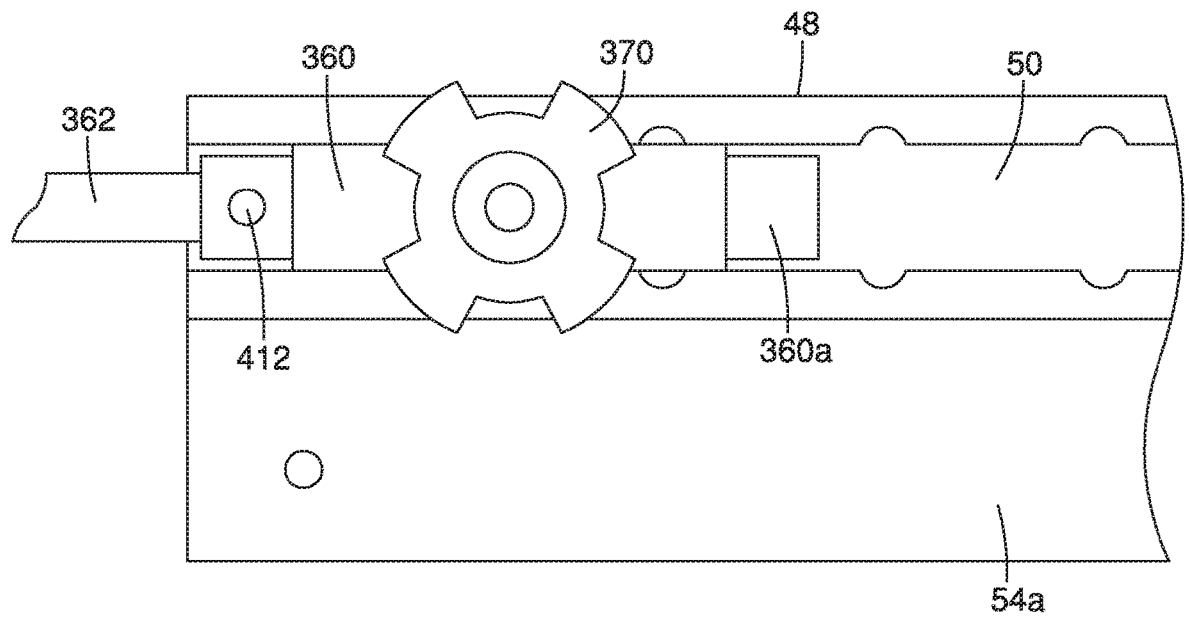
FIG. 24 is a side view of the handle assembly and the utility track with the handle assembly in the in-use orientation showing a portion of a locking portion of the handle assembly in accordance with the fourth embodiment.
Figure 25:
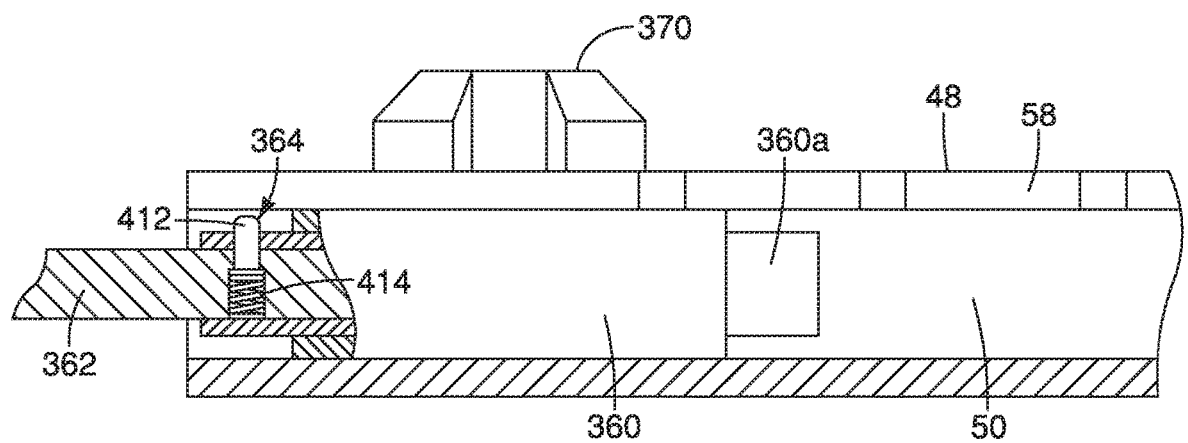
FIG. 25 is a cross-sectional view of the handle assembly and the utility track taken along the line 25-25 in FIG. 24, showing further details of the locking portion of the handle assembly in accordance with the fourth embodiment.
Figure 26:
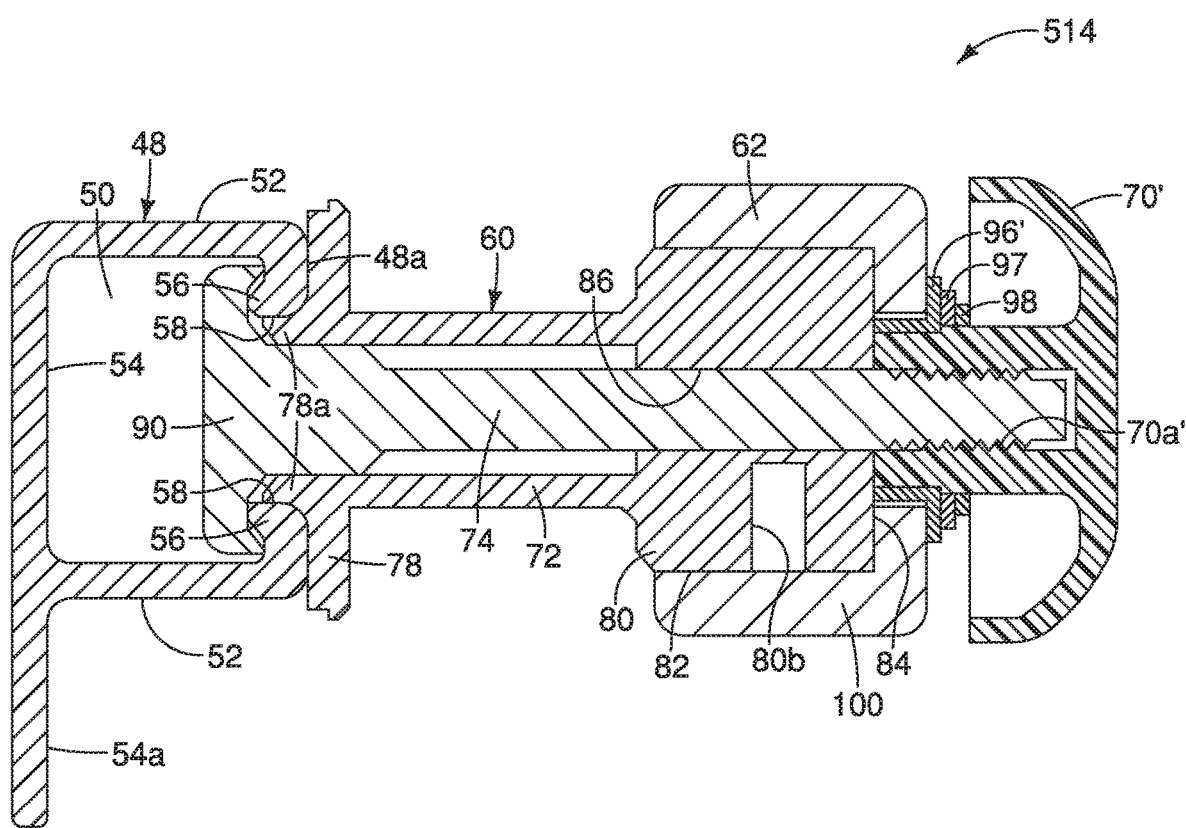
FIG. 26 is a cross-sectional view of a portion of a handle assembly, similar to FIG. 7, showing a base, a grip handle and a locking portion in accordance with a fifth embodiment.

Referring now to FIG. 20, a handle assembly 214 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the handle assembly 214 is identical to the handle assembly 114 of the second embodiment except that the pivoting member 100' of the second embodiment has been replaced with a pivoting member 200. The pivoting member 200 includes all of the features of the pivoting member 100', except that the pivoting member 200 has been provided with a disk or rounded shape.

Fourth Embodiment

Referring now to FIGS. 21-25, a handle assembly 314 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the handle assembly 314 includes a base 360, a grip handle 362 and a locking portion 364.

The base 360 includes a threaded member 370 that operates an attachment assembly (not shown) that clamps to the utility track in a manner similar to that described in the first embodiment. Therefore, further description will be omitted for the sake of brevity. The base 360 also includes a support tube 360a that receives the grip handle 362, such that the grip handle 362 is slidable through the support tube 360a. Specifically, the grip handle 362 is slidable between an in-use orientation show in in FIGS. 21 and 23-25. When in the in-use orientation, the grip handle 362 extends in a horizontal direction parallel to the first side wall 22. When in the stowed orientation (FIG. 22), the grip handle 362 also extends in the horizontal direction and is positioned within the utility track 48.

Specifically, the grip handle 362 is slidably movable between the stowed orientation and the in-use orientation.

The locking portion 364 (the position locking mechanism) includes a spring biased pin 412 biased by a spring 441 to the locked orientation. The spring biased pin 412 is manually pressed to an unlocked orientation and spring biased to return to a locked orientation. With the locking portion 364 in the locking orientation, the grip handle 362 is prevented from sliding relative to the base 360. In an unlocked orientation, the grip handle 362 is free to slide relative the base 360 between the stowed orientation and the in-use orientation.

Fifth Embodiment

Referring now to FIGS. 21-25, a handle assembly 314 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the handle assembly 514 has every component of the handle assembly 514, as described above, except that the threaded member 70 is replaced with a modified threaded member 70', the annular washer 96 is replaced by an annular washer 96' and washers 97 and 98 have been added.

The threaded member 70' includes an annular sleeve portion 70a' with external threads. The annular washer 96' includes internal threads that thread to and engage the external threads of the annular sleeve portion 79a'. The annular washer 96' serves as a spacer that ensures pivoting movement of the grip handle 62 abut the supporting end 80. One of the new washers 97 and 98 is a friction washer that ensures that when the threaded member 70' is tightened clamping the handle assembly 514 to the utility track 48, the threaded member 70' remains tightened.

The various vehicle elements and components are conventional components that are well known in the art. Since such vehicle elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a cargo area structure having a floor, a first side wall and a tailgate at least partially defining a cargo area, the tailgate being movable between an open orientation exposing a rear end of the cargo area and a closed orientation blocking the rear end of the cargo area;
   a retractable step installed to the cargo area structure beneath the floor and the first side wall and adjacent to the tailgate; and
   a handle assembly having a base and a grip handle supported to the base, the base being attached to an upright surface of the first side wall, the base having a position locking mechanism configured such that in response to manual operation of the position locking mechanism the grip handle is movable from a stowed orientation and an in-use orientation such that in the in-use orientation the grip handle is positioned such that an individual using the step to enter the cargo area grabs the grip handle for assistance in stepping up into the cargo area.

2. The vehicle body structure according to claim 1, wherein
the first side wall includes a utility track configured to receive and support cargo area accessories, the utility track being rigidly and fixedly attached to the first side wall at a location below and adjacent to the upper surface of the first side wall, the utility track defining the upright surface of the first side wall.

3. The vehicle body structure according to claim 2, wherein
the base of the handle assembly is directly attached to the utility track via mechanical fasteners such that the base overlays a portion of the upright surface of the utility track.

4. The vehicle body structure according to claim 2, wherein
the utility track is an elongated member that includes a track portion having spaced apart lengthwise extending walls that define a pair of projections with an opening between the projections that are open to an elongated hollow channel within the utility track, the track portion of the utility track being located above the upright surface of the utility track.

5. The vehicle body structure according to claim 4, wherein
the base of the handle assembly includes an attachment assembly configured to clamp to the pair of projections of the track portion of the utility track.

6. The vehicle body structure according to claim 5, wherein
the attachment assembly includes a clamping member and a threaded member such that with the handle assembly attached to the utility track, the clamping member is located within the elongated hollow channel and the threaded member threadedly forces the clamping member and the base together clamping to the lengthwise extending walls.

7. The vehicle body structure according to claim 6, wherein
the base of the handle assembly includes a block member and a pivoting member configured to pivot about the block member, and
the position locking mechanism is installed to the pivoting member, and the grip handle is installed to the pivoting member for pivoting movement therewith.

8. The vehicle body structure according to claim 7, wherein
the position locking mechanism is configured such that in a locking orientation the pivoting member and the grip handle are prevented from pivoting about the block member, and in an unlocked orientation the pivoting member and the grip handle are free to pivot about the block member between the stowed orientation and the in-use orientation.

9. The vehicle body structure according to claim 8, wherein
the position locking mechanism includes a spring biased pin that is urged to the locking orientation.

10. The vehicle body structure according to claim 1, wherein
the grip handle of the handle assembly when in the stowed orientation extends horizontally in a direction parallel to the first side wall.

11. The vehicle body structure according to claim 10, wherein
the grip handle of the handle assembly when in the in-use orientation extends in an upright direction.

12. The vehicle body structure according to claim 1, wherein
the grip handle of the handle assembly when in the in-use orientation extends in a horizontal direction parallel to the first side wall and when in the stowed orientation extends in the horizontal direction parallel to the first side wall.

13. The vehicle body structure according to claim 12, wherein
the base of the handle assembly is configured such that the grip handle is slidably movable between the stowed orientation and the in-use orientation.

14. The vehicle body structure according to claim 13, wherein
the position locking mechanism includes a spring biased pin that is manually pressed to an unlocked orientation and spring biased to return to a locked orientation such that in the locking orientation the grip handle is prevented from sliding relative to the base member, and in an unlocked orientation the grip handle is free to slide relative the base between the stowed orientation and the in-use orientation.

15. The vehicle body structure according to claim 1, wherein
the retractable step is moveable between a retracted orientation in which the step is partially concealed below the floor and the first side wall, and an extended orientation in which the step extends rearward and outboard away relative to the cargo area.

* * * * *